United States Patent Office 3,017,403
Patented Jan. 16, 1962

3,017,403
ETHYLENE POLYMERIZATION
Walter R. Wszolek, Ellicott City, Md., assignor to W. R. Grace & Co., a corporation of Connecticut
No Drawing. Filed Apr. 14, 1959, Ser. No. 806,225
7 Claims. (Cl. 260—94.9)

This invention is directed to polymerizing ethylene in the presence of a novel catalyst.

In summary the invention relates a process for making polyethylene that comprises subjecting ethylene to the action of a catalyst consisting essentially of $CrCl_2$ activated by grinding $CrCl_2$ in an inert atmosphere.

The $CrCl_2$ catalyst so prepared is useful in making high molecular weight polyethylene. It is operable at polymerization temperatures ranging from room temperature up to 300° C. and higher, and at pressures from a few atmospheres, e.g. 100 p.s.i.g. to 5000 p.s.i.g. and even higher. For practical operation, however, temperatures in the range of 100–200° C. and pressures of 300 to 500 p.s.i.g. are suitable.

The polymerization reaction is preferably but not necessarily performed in a liquid hydrocarbon reaction medium to facilitate handling of the polymer and to insure more complete contact between reactant and catalyst. The liquid hydrocarbon used as the reaction medium should be one which is a solvent for the ethylene monomer, liquid under the conditions of temperature and pressure used, and which contains no contaminants such as moisture, oxygen, carbon dioxide, hydrogen sulfide and the like which deactivate the catalyst. Preferred liquid hydrocarbon reaction mediums include pentane, hexane, heptane, cyclohexane, octane, benzene, xylene, toluene and the like.

The amount of activated catalyst is not critical. Relatively small amounts are operable to form relatively large amounts of polymer.

The grinding step to activate the $CrCl_2$ catalyst is performed under a slight pressure e.g. 2 atm. of an inert gas to insure the enhanced catalytic activity of the $CrCl_2$ and to keep the thus activated catalyst free from contact with contaminants which tend to deactivate or poison the catalyst thereby decreasing or terminating its ethylene polymerization power. Such contaminants include oxygen, moisture, carbon dioxide, and the like. In addition, to preserve freedom from contaminants, the activated $CrCl_2$ catalyst is transferred from the ball mill in a "dry box" maintained under a slight pressure of a gas inert to the activated catalyst. In the example stated herein, argon is used as the inert gas in the ball mill and also in the dry box, however, the other noble gases especially helium and neon and pure dry lamp-grade nitrogen are equally suitable. The transference of the activated catalyst in the dry box can be made either to an argon-purged storage vessel for later polymerization use or directly into a purged polymerization reactor.

Although a ball mill was used in the example herein, substantially any mechanism can be used for the grinding operation that can be maintained under slight pressure, free from catalyst contaminants, and which causes the individual pieces of $CrCl_2$ to break up into smaller particles and/or causes their surfaces to be cleaned or abraded. Other operable mechanisms would include a rod mill, pebble mill, jet (or colloid) mill, vibrating ball mill and the like.

The duration of the grinding step is dependent upon the efficiency of the grinding mechanism employed. In runs using a ball mill, the grinding should be carried on for at least 24 hours, and preferably for several days, i.e. 2 to 5 or more. Generally, I have found that after extended ball milling periods, i.e. about 14 days, the surface area of the $CrCl_2$ particles decreases. This decrease in surface area appears to be due to the agglomeration of smaller particles by electrostatic or Van der Waals forces.

Following the polymerization step, the crude ethylene polymer obtained by the practice of this invention may be purified and recovered by techniques well known in the art. For example, the crude polymer may be refluxed with alcoholic acids, e.g., HCl methanol, followed by filtration and drying.

Throughout this specification it will be understood that all samples of activated $CrCl_2$ are weighed and added to the polymerization reactor (autoclave) under conditions equivalent to the conditions of grinding as regards freedom from contaminants.

The following examples will aid in illustrating the invention but do not limit its scope.

EXAMPLE 1

Catalyst activation 60 g. of $CrCl_2$ (minus 20 mesh) were charged to an argon-purged one pint stainless steel ball mill about one third full of ⅜" stainless steel balls. The ball milling was carried out under argon for 2 days. The ball mill was then opened in a dry box maintained under a slight pressure of argon and the thus activated $CrCl_2$ catalyst was therein transferred to an argon-purged storage vessel for subsequent polymerization use.

EXAMPLE 2

Polymerization of ethylene

Using precautions to insure the exclusion of contaminants from the activated catalyst, 4.19 g. $CrCl_2$ prepared in Example 1 were charged to a nitrogen-purged one liter autoclave containing 300 g. of pure dry cyclohexane and equipped with mechanical stirrer and gas inlet. Agitation was commenced and the autoclave heated to 139° C. and pressurized with ethylene to 460 p.s.i.g. Reaction was allowed to take place for 2 hours at temperatures between 139–153° C. and pressures in the range 430–490 p.s.i.g. Upon cooling and venting a solid ethylene polymer product (approximately 1 g.) was obtained.

The uses of the polyethylene of this invention are analogous to those prepared by prior art procedures, e.g. to make moldings, film, filament, pipe, tubing and the like using substantially the same equipment and technique customary for the solid polyethylene of the prior art.

I claim:

1. The process of polymerizing ethylene which comprises subjecting ethylene under pressure to the action of a catalyst consisting essentially of $CrCl_2$ activated by grinding in an inert atmosphere for 1 to 5 days.

2. The process according to claim 1 in which the polymerization is performed at a temperature in the range of 50 to 300° C. and a pressure of 100 to 1000 p.s.i.

3. The process according to claim 1 wherein the polymerization is performed in the presence of a liquid hydrocarbon reaction medium.

4. The process according to claim 3 in which the liquid hydrocarbon reaction medium is a member of the group consisting of pentane, hexane, heptane, cyclohexane, octane, benzene, xylene, and toluene.

5. The process of polymerizing ethylene that comprises heating ethylene in a liquid hydrocarbon reaction medium at a pressure of at least 100 p.s.i.g. in the presence of a catalyst consisting essentially of $CrCl_2$ activated by grinding in an inert atmosphere for 1 to 5 days.

6. The process according to claim 5 in which the liquid hydrocarbon reaction medium is cyclohexane.

7. The process of polymerizing ethylene that comprises heating ethylene in cyclohexane to a temperature in the range 139–153° C. at a pressure of 430–490 p.s.i.g. in the presence of a catalyst consisting essentially of $CrCl_2$ activated by grinding in an inert argon atmosphere for 1 to 5 days.

References Cited in the file of this patent

UNITED STATES PATENTS

| | | |
|---|---|---|
| 2,623,860 | Haensel | Dec. 30, 1952 |
| 2,836,570 | Peers | May 27, 1958 |
| 2,870,131 | Guillet et al. | Jan. 20, 1959 |
| 2,878,241 | Schnieder | Mar. 17, 1959 |
| 2,892,000 | Skiles | June 23, 1959 |

FOREIGN PATENTS

| | | |
|---|---|---|
| 534,792 | Belgium | May 1, 1955 |
| 543,913 | Belgium | June 23, 1956 |
| 1,132,506 | France | Nov. 5, 1956 |

OTHER REFERENCES

Mellor: "A Comprehensive Treatise on Inorganic and Theoretical Chemistry," vol. 11 (366–367).